May 20, 1952  R. LAPSLEY  2,597,502
FLUID CLUTCH WITH SERVO ENGAGEMENT
Filed May 31, 1945  2 SHEETS—SHEET 1

INVENTOR.
Robert Lapsley
BY Walter E. Schirmer
Atty.

May 20, 1952 R. LAPSLEY 2,597,502
FLUID CLUTCH WITH SERVO ENGAGEMENT
Filed May 31, 1945 2 SHEETS—SHEET 2

INVENTOR.
Robert Lapsley
BY Walter E. Schirmer

Patented May 20, 1952

2,597,502

UNITED STATES PATENT OFFICE 2,597,502

FLUID CLUTCH WITH SERVO ENGAGEMENT

Robert Lapsley, Berrien Springs, Mich., assignor to Clark Equipment Company, Buchanan, Mich., a corporation of Michigan Application May 31, 1945, Serial No. 596,835

4 Claims. (Cl. 192—85)

1

This invention relates to transmissions, and more particularly is concerned with an improvement in the clutching mechanism by which the gear trains within the transmission are clutched to the main shaft.

Primarily, the present invention is concerned with an improvement over the type of clutching mechanism shown in my copending application, Serial No. 526,829, filed March 15, 1944, and relates particularly to piston operated internal clutches carried within the gear members for clutching the gears to the associated shaft. It is understood, of course, that the clutch mechanism, per se, may be used in other devices than that herein shown and described.

One of the primary objects of the present invention is to provide a construction in which a relatively light piston load is required to set the clutch in operation so that the entire load for clutching the piston to effect movement of the vehicle is not produced by the hydraulic action. In this connection, it should be pointed out that with the present construction it will be necessary only in rare cases to provide any appreciable piston displacement for locking the gear to its associated shaft.

Another feature of the present invention is to provide a construction in which the shaft carries a hub member having circumferentially spaced oppositely acting pistons, these pistons acting on clutch discs engageable with side plates bolted to the annular gear member for clutching these plates into positive engagement with the hub member, whereby the gear is locked to the shaft. In a construction of this type, I have provided means for producing a servo action so that as the pistons are actuated, suitable roller members mounted on oppositely inclined cam surfaces act to produce increasing frictional pressure due to the relative displacement between the hub and the gear. This in turn provides a building up of the frictional engagement so that a small displacement of the pistons will operate to actuate the clutch. The angle of inclination of the raceways or ramps upon which the rollers operate is such as to insure return of the clutch plates to retracted position upon release of the hydraulic pressure.

With such a construction it is apparent that the load on the race or ramp upon which the rollers operate will never exceed that necessary to drive the vehicle, thereby never over stressing the parts, such as might occur if the piston pressure alone were relied upon to produce the clutching action.

Other objects and advantages of the present invention will appear more fully from the following detailed description, which, taken in conjunction with the accompanying drawings, will disclose to those skilled in the art the particular construction and operation of a preferred form of the present invention.

Figure 1:
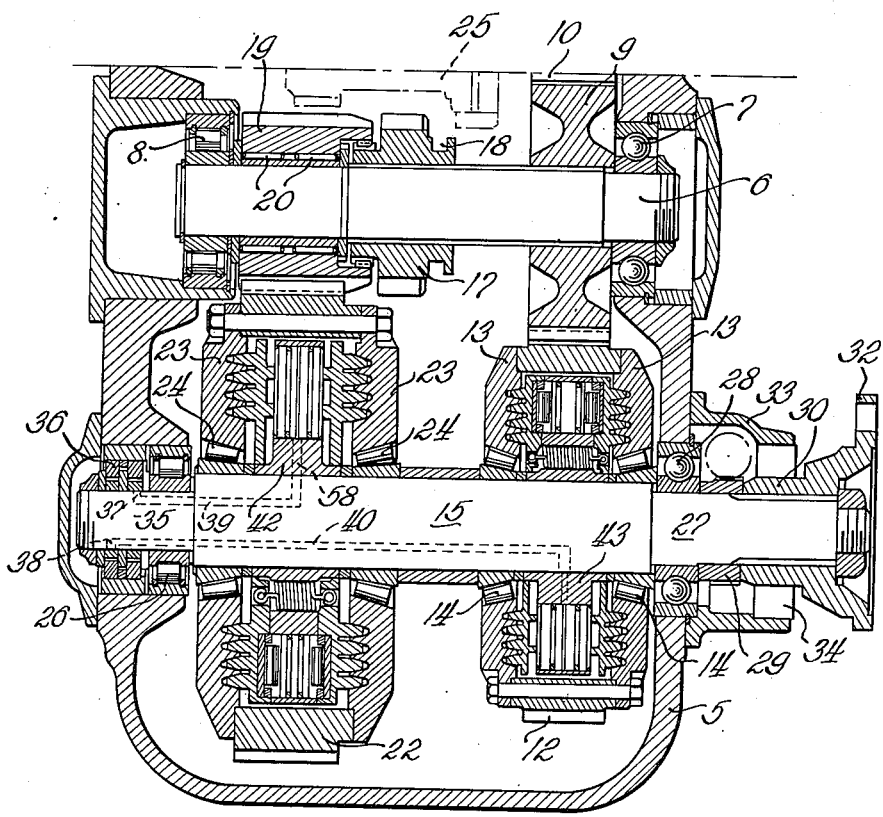
Figure 1 is a sectional view through a transmission embodying the present invention.

Referring now in detail to Figure 1, this figure illustrates one manner of operating a transmission with the clutches of the type provided in the present invention. There is disclosed in this figure a transmission housing 5 which is adapted to receive a shaft 6 mounted upon bearings 7 and 8, the shaft 6 having splined thereon a gear 9 adapted to be driven from the gear 10 receiving driving torque through a fluid torque converter or the like. The gear 9 is in constant meshing engagement with a gear element 12 in the form of an annular ring gear, having bolted to the sides thereof side plate members 13, which in turn are mounted for rotation upon bearings 14 carried by the output shaft 15 whereby the gear and the side plate members 13 normally rotate relative to the shaft 15.

Also splined on the shaft 6 is a sliding gear member 17 having a yoke hub 18 adapted to receive a shifter fork, whereby, when the gear 17 is slid axially into the position shown in Figure 1, it has meshing engagement with the gear 19 rotatably mounted as by means of the bearings 20 upon the shaft 6, whereby the gear 19 is clutched to the shaft 6 and in turn drives a second annular ring gear 22, having bolted to the sides thereof side plate members 23 mounted upon bearings 24 so that the gear element is rotatably journalled on the shaft 15. When the gear 17 is shifted axially to the right, it is adapted to move out of engagement with gear 19, thereby disconnecting drive from gear 19 to gear 22. Also, gear 17 can be shifted still further axially to the right to engage reverse gear member 25 rotatably journalled upon a lay shaft (not shown), for providing a reverse drive through the transmission.

The shaft 15 is mounted at one end by means of the roller bearing assembly 26 within the end wall of the transmission, and has the reduced portion 27 projecting outwardly through the opposite end wall of the transmission and being journalled in the ball bearing assembly 28. The projecting end of the shaft portion 27 is provided with a speedometer gear 29 and with the hub portion 30 of a companion flange 32 of a universal joint. A suitable bearing cap 33 is provided for enclosing the speedometer gearing, and is provided with a suitable seal 34 fitting about the external surface of the hub 30 of the companion flange.

The opposite end of shaft 15, which is of reduced diameter as indicated at 35, is adapted to receive, as indicated at 36, an oil distributor member of the type also shown in my copending application, whereby oil from the automatic control system is introduced into suitable passageways 37 and 38 leading into axial passageways 39 and 40 connecting through radial ports with the respective hub portions 42 and 43 of the gear members 22 and 12, respectively, these hub portions being splined upon the surface of shaft 15. By means of a control valve such as described in my copending application, oil under pressure is selectively transmitted through the distributor member 36 into either of the passageways 39 or 40, whereby each of the respective gear members 22 or 12 may be selectively clutched to the shaft 15 for driving this shaft at a speed ratio determined by the relationship of the gears 12 and 9, or the gears 22 and 19. It is, of course, obvious that any number of gear trains may be so provided, each of the gear trains containing one gear having the internal clutch arrangement as provided.

Figure 2:
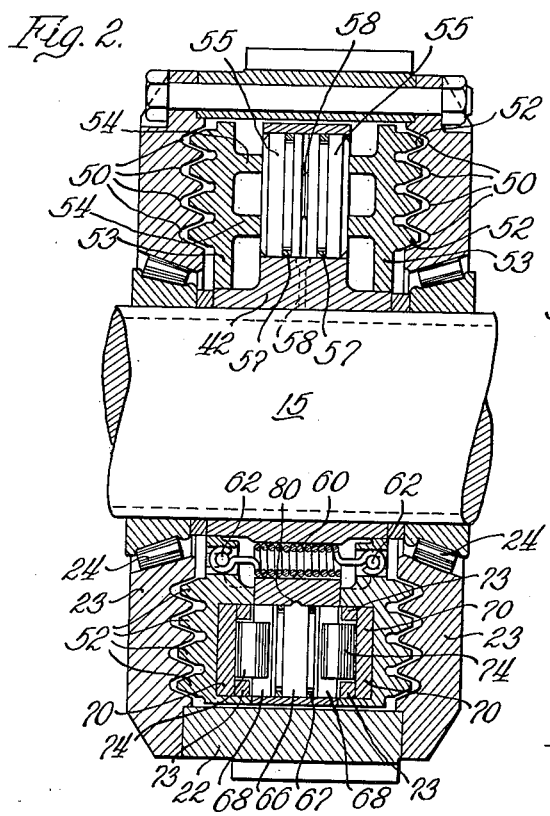
Figure 2 is an enlarged detail view of a gear clutch showing the present construction.
Figure 4:
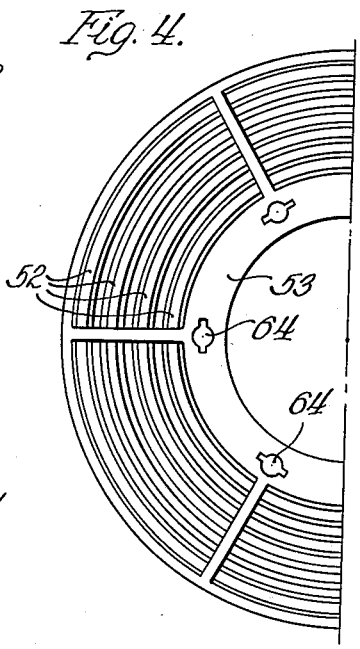
Figure 4 is an end view of one of the clutch plates looking at it from the outside.
Figure 5:
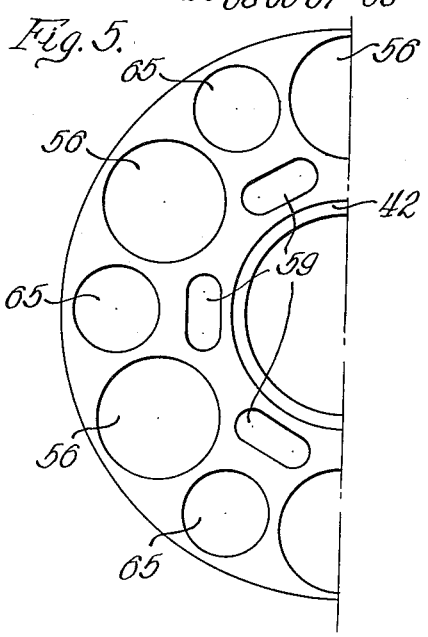
Figure 5 is an elevational view of the hub member carried by the shaft.
Figure 6:
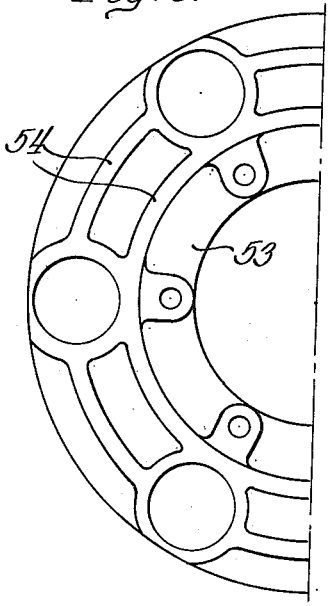
Figure 6 is an elevational view of the inside surface of the clutch plate.

One of these clutches is shown more in detail in Figure 2; for example, the clutch mechanism for the gear 22. It will be seen from this drawing that the inner radial faces of the side plates 23 are provided with annular V-shaped grooves 50 which are concentrically arranged, and which are adapted to receive corresponding annular ribs or projections 52 carried by the external surfaces of clutch plate members 53. Each of the clutch plate members 53 is provided on its inner annular surface with axially extending concentric annular ribs 54, which in turn bear against the ends of pistons 55 carried within suitable circumferentially spaced openings 56 in the hub member 42. The pistons 55 are each provided with annular grooves intermediate their ends adapted to receive piston rings 57, and are held in endwise spaced relation by button portions 58, providing a slight clearance between the adjacent ends of the pistons through which the oil under pressure from the radial port connected with the passageway 39, as indicated at 58, flows in between the pistons to spread them apart.

Intermediate the openings 56 which receive the pistons 55, the hub member 42 is provided with elongated apertures 59 through which are adapted to extend the spring members 60, these spring members being suitably connected at their ends through pins 62 to the hub portions of the friction plates 53, the springs being locked in position by the pins entering through suitable slots in the openings 64 provided in the hub portions of the plate members 53. These springs serve the function of retracting the plates 53 toward each other upon release of pressure between the pistons 55 to withdraw the plates from clutching engagement within the clutches 50 of the side plates 23.

Figure 3:
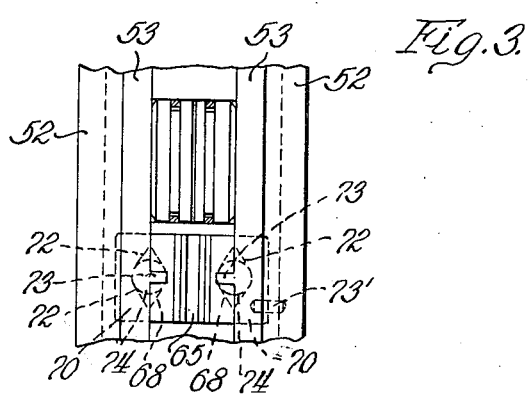
Figure 3 is a diagrammatic plan view showing the relative arrangement of the pistons and roller members.

Intermediate each of the circumferentially spaced openings 56 in the hub member 42 there are provided smaller openings 65, which openings are adapted to receive a floating support member 66 carrying the piston rings 67, and also being provided with oppositely inclined ramp surfaces 68, as shown in detail in Figure 3. The insert 65 is provided with the same type of ramp surface at both ends thereof, the bottom of the depression being formed on a radial line of the axis of rotation. The two piston rings 67 are for the purpose of preventing axial movement of oil under pressure out through the openings 65.

Suitable circular inserts 70 are provided in recesses in the inner face of plate members 53 corresponding with the openings 65, the inserts 70 also having ramp surfaces 72. One of each opposed inserts 70 is held against rotation by means of dowel pins 73 while the other is free to rotate so that they will always be positively alined with the mating ramps 68 of the central member 65. Also, in machining such inserts, there is provided a tongue portion 73 at the top and bottom portions thereof, which is for the purpose of preventing radial displacement of the rollers 74 as by centrifugal action or the like. Thus, the rollers are held between the inner and outer tongues 73 against radial movement, and react against the opposite cam surfaces 68 and 72 to provide the servo action whenever there is a tendency for relative rotation between the hub member 42 and the side plates 23 with the piston energized.

This camming action of the rollers on these oppositely inclined surfaces produces a servo action caused by the drag of the friction plates 53 engaging the side plates 23, causing the rollers to roll up the inclines and thereby exert an additional outward thrust upon the friction plates 53. This thrust is in direct proportion to the clamping action required to drive the vehicle, and the rollers will climb up the ramps a sufficient distance to produce a pressure loading of the friction plates against the side plates, which is never in excess of that necessary to produce the final clamping action, inasmuch as the relative movement of the hub member and side members produces the roller movement and when these members rotate conjointly, no further movement of these rollers is necessary. The position of the rolls on the ramps automatically adjusts itself as the resistance to conjoint movement varies, but never exceeds that required to produce positive clutching action. Upon release of the pressure between each pair of pistons 55, the springs 60 which have been expanded will contract to draw the friction plates 53 together, collapsing the pistons 55, and, at the same time, causing the rollers 74 to return to a bottoming position in the respective raceways 68 and 72. By dowelling one of the inserts 70 in fixed position, it will be apparent that through the rollers 74, the remainder of the assembly, including the members 65 and the opposite insert 70, will be held in alined position.

In the operation of the device as thus described, oil under pressure is introduced between the pistons 55 through the passageway 39, port 58, and the connecting drilled holes 80. This oil enters between the pistons 55, moving them axially apart. This in turn produces axial separation of the plates 53, tensioning the springs 60, and forcing the ribs 52 of these plates into the recesses 50 of the side plates 23. As the ribs 52 frictionally engage in the grooves 50, the relative rotation between the members 42 and 53 produces an angular displacement of the plate members 53. This displacement causes the rollers 74 to ride up the opposite raceways 68 and 72, providing a camming action against the center member 65, producing an increased force axially outwardly on the plate members 53, forcing them firmly into the frictional engagement with the side plates 53, and thereby locking the gear member 22 securely to the hub member 42, and consequently to shaft 15.

It is therefore apparent that I have provided an improved type of clutching arrangement which eliminates the necessity of providing a large volume of fluid under high pressure to provide the clutching engagement, since all of the fluid that is required is that necessary to provide the initial contact between the side plates and the friction plates. From this point on, the rollers 74 function to provide the additional axial force necessary to produce positive clutching engagement.

I am aware that various changes may be made in certain details of the present construction, and I therefore do not intend to be limited except as defined by the scope and spirit of the appended claims.

I claim:

1. In combination a shaft, a hub splined thereon having a radial spider portion, a gear member encircling said spider portion and having radial side plates on opposite sides of said spider and journaled on said shaft, clutch discs carried on opposite faces of said spider, circumferentially spaced piston means in said spider operable to spread said discs axially into contact with said side plates, servo cam means between said discs and spider responsive to relative rotation therebetween for forcing said discs into clutching engagement with said side plates, and said servo cam means being disposed alternately relative to said piston means.

2. In combination, a shaft, an annular gear member having radially inwardly extending axially spaced end plates rotatably journaled in said shaft, a hub splined on said shaft intermediate said end plates, said hub having a radial spider portion, clutch discs carried on opposite ends of said hub, a first plurality of circumferentially spaced bores formed in said spider, a pair of oppositely facing pistons in each of said first bores between said clutch discs, means for admitting fluid under pressure to the bores between said pistons for urging the latter into engagement with the adjacent clutch discs whereby the latter are urged into engagement with said end plates, a second plurality of circumferentially spaced bores alternately formed in said spider relative to said first bores, the axes of said second bores lying radially outwardly of the axes of said first bores, servo cam means in each of said second bores between said clutch discs responsive to relative rotation between the latter and said spider for forcing said clutch discs into clutching engagement with said end plates.

3. In combination, a shaft, an annular gear member having radially inwardly extending axially spaced end plates rotatably journaled on said shaft, a hub splined on said shaft intermediate said end plates, said hub having a radial spider portion, clutch discs carried on opposite ends of said hub, a first plurality of circumferentially spaced bores formed in said spider, a pair of oppositely facing pistons in each of said first bores between said clutch discs, means for admitting fluid under pressure to the bores between said pistons for urging the latter into engagement with the adjacent clutch discs whereby the latter are urged into engagement with said end plates, a second plurality of circumferentially spaced bores alternately formed in said spider relative to said first bores, the axes of said second bores lying radially outwardly of the axes of said first bores, servo cam means in each of said second bores between said clutch discs responsive to relative rotation between the latter and said spider for forcing said clutch discs into clutching engagement with said end plates, a plurality of circumferentially spaced apertures alternately formed in said spider relative to said first bores, the axes of said apertures lying radially inwardly of the axes of said first bores, and spring means disposed in said apertures having connection at the ends thereof to each of said clutch discs for normally biasing the latter out of clutching engagement with the adjacent end plates.

4. In combination, a shaft, an annular gear member having radially inwardly extending axially spaced end plates rotatably journaled on said shaft, a hub splined on said shaft intermediate said end plates, said hub having a radial spider portion, clutch discs carried on opposite ends of said hub, a first plurality of circumferentially spaced bores formed in said spider, a pair of oppositely facing pistons in each of said first bores between said clutch discs, means for admitting fluid under pressure to the bores between said pistons for urging the latter into engagement with the adjacent clutch discs whereby the latter are urged into engagement with said end plates, a second plurality of circumferentially spaced bores alternately formed in said spider relative to said first bores, the axes of said second bores lying radially outwardly of the axes of said first bores, servo cam means in each of said second bores between said clutch discs comprising an insert having tapered cam surfaces at the opposite ends thereof, inserts in the faces of each of said clutch discs, said last named inserts having tapered cam surfaces, radially disposed anti-friction members normally disposed between the pairs of adjacent cam surfaces at the base thereof and operable to ride up the oppositely disposed cam surfaces upon relative rotation between said clutch discs and said spider for forcing said clutch discs into clutching engagement with said end plates.

ROBERT LAPSLEY.

REFERENCES CITED

The following references are of record in the file of this patent:

UNITED STATES PATENTS

| Number | Name | Date |
|---|---|---|
| 506,517 | Leibert | Oct. 10, 1893 |
| 1,748,827 | Boltshauser | Feb. 25, 1930 |
| 1,783,513 | Maurer | Dec. 2, 1930 |
| 1,789,271 | Cappa | Jan. 13, 1931 |
| 1,914,688 | Furnas | June 20, 1933 |
| 1,953,568 | Rose | Apr. 3, 1934 |
| 2,063,444 | Lambert | Dec. 8, 1936 |
| 2,081,824 | Lambert | May 25, 1937 |
| 2,220,542 | Peterson | Nov. 5, 1940 |
| 2,221,399 | Geyer | Nov. 12, 1940 |
| 2,245,988 | Lambert | June 17, 1941 |
| 2,333,682 | Schneider | Nov. 9, 1943 |
| 2,372,123 | Sadler | Mar. 20, 1945 |
| 2,375,854 | Lambert | May 15, 1945 |
| 2,398,806 | Schneider | Apr. 23, 1946 |